(12) United States Patent
Manter

(10) Patent No.: US 7,200,151 B2
(45) Date of Patent: Apr. 3, 2007

(54) APPARATUS AND METHOD FOR ARBITRATING AMONG EQUAL PRIORITY REQUESTS

(76) Inventor: Venitha L. Manter, 3212 Creekstone Dr., Fort Collins, CO (US) 80625

( * ) Notice: Subject to any disclaimer, the term of this patent is extended or adjusted under 35 U.S.C. 154(b) by 1035 days.

(21) Appl. No.: 10/184,168

(22) Filed: Jun. 28, 2002

(65) Prior Publication Data

US 2004/0001503 A1    Jan. 1, 2004

(51) Int. Cl.
*H04J 3/02* (2006.01)
(52) U.S. Cl. .................................................. 370/462
(58) Field of Classification Search ............... 370/462, 370/447, 360, 411, 389, 400, 242, 235, 252, 370/474; 714/752, 776
See application file for complete search history.

(56) References Cited

U.S. PATENT DOCUMENTS

| 6,563,818 B1 * | 5/2003 | Sang et al. | 370/379 |
| 6,898,752 B2 * | 5/2005 | Tucker | 714/752 |

* cited by examiner

*Primary Examiner*—Chi Pham
*Assistant Examiner*—Alexander O. Boakye

(57) ABSTRACT

A switch for use with an InfiniBand network having a management port adapted to arbitrate among equal priority signals requesting attention from ports on the switch. In particular, the management port included three registers that are used to arbitrate between the requests. The first register stores an indication of each type of signal from each port issuing the signal. The second register to indicate which single type of signal from which port has the priority to be handled next. The third register that indicates which signal is to be handled next or is currently being handled.

13 Claims, 5 Drawing Sheets

APPARATUS AND METHOD FOR ARBITRATING AMONG EQUAL PRIORITY REQUESTS

BACKGROUND OF THE INVENTION

InfiniBand™ is an emerging networking technology that hopes to replace the current PCI bus standard, which only supports up to 133 Mbps (Megabits per second) transfers, with a broader standard that supports a maximum shared bandwidth of 566 Mbps. InfiniBand is the culmination of the combined efforts of about 80 members that are led by Intel, Compaq, Dell, Hewlett-Packard, IBM, Microsoft and Sun Systems who collectively call themselves the InfiniBand Trade Association. The InfiniBand Trade Association has published a specification entitled: Infiniband™ Architecture Specification Release 1.0. The Specification spans three volumes and is incorporated herein by reference.

The InfiniBand Architecture (referred to herein as "IBA") is a first order interconnect technology, independent of the host operating system (OS) and processor platform, for interconnecting processor nodes and I/O nodes to form a system area network. IBA is designed around a point-to-point, switched I/O fabric, whereby end node devices (which can range from very inexpensive I/O devices like single chip SCSI or Ethernet adapters to very complex host computers) are interconnected by cascaded switch devices. The physical properties of the IBA interconnect support two predominant environments:

i. Module-to-module, as typified by computer systems that support I/O module add-in slots
 ii. Chassis-to-chassis, as typified by interconnecting computers, external storage systems, and external LAN/WAN access devices (such as switches, hubs, and routers) in a data-center environment.

IBA supports implementations as simple as a single computer system, and can be expanded to include: replication of components for increased system reliability, cascaded switched fabric components, additional I/O units for scalable I/O capacity and performance, additional host node computing elements for scalable computing, or any combinations thereof. IBA is scalable to enable computer systems to keep up with the ever-increasing customer requirement for increased scalability, increased bandwidth, decreased CPU utilization, high availability, high isolation, and support for Internet technology. Being designed as a first order network, IBA focuses on moving data in and out of a node's memory and is optimized for separate control and memory interfaces. This permits hardware to be closely coupled or even integrated with the node's memory complex, removing any performance barriers.

IBA uses reliable packet based communication where messages are enqueued for delivery between end nodes. IBA defines hardware transport protocols sufficient to support both reliable messaging (send/receive) and memory manipulation semantics (e.g. remote DMA) without software intervention in the data movement path. IBA defines protection and error detection mechanisms that permit IBA transactions to originate and terminate from either privileged kernel mode (to support legacy I/O and communication needs) or user space (to support emerging interprocess communication demands).

IBA can support bandwidths that are anticipated to remain an order of magnitude greater than current I/O media (SCSI, Fiber Channel, and Ethernet). This enables IBA to act as a common interconnect for attaching I/O media using these technologies. To further ensure compatibility across varying technologies, IBA uses IPv6 headers, supporting extremely efficient junctions between IBA fabrics and traditional Internet and Intranet infrastructures.

FIG. 1 is a block diagram of the InfiniBand architecture layers 100. IBA operation can be described as a series of layers 100. The protocol of each layer is independent of the other layers. Each layer is dependent on the service of the layer below it and provides service to the layer above it.

The physical layer 102 specifies how bits are placed on a wire to form symbols and defines the symbols used for framing (i.e., start of packet & end of packet), data symbols, and fill between packets (Idles). It specifies the signaling protocol as to what constitutes a validly formed packet (i.e., symbol encoding, proper alignment of framing symbols, no invalid or nondata symbols between start and end delimiters, no disparity errors, synchronization method, etc.).

The link layer 104 describes the packet format and protocols for packet operation, e.g. flow control and how packets are routed within a subnet between the source and destination. There are two types of packets: link management packets and data packets.

Link management packets are used to train and maintain link operation. These packets are created and consumed within the link layer 104 and are not subject to flow control. Link management packets are used to negotiate operational parameters between the ports at each end of the link such as bit rate, link width, etc. They are also used to convey flow control credits and maintain link integrity.

Data packets convey IBA operations and can include a number of different headers. For example, the Local Route Header (LRH) is always present and it identifies the local source and local destination ports where switches will route the packet and also specifies the Service Level (SL) and Virtual Lane (VL) on which the packet travels. The VL is changed as the packet traverses the subnet but the other fields remain unchanged. The Global Route Header (GRH) is present in a packet that traverses multiple subnets. The GRH identifies the source and destination ports using a port's Global ID (GID) in the format of an IPv6 address.

There are two CRCs in each packet. The Invariant CRC (ICRC) covers all fields which should not change as the packet traverses the fabric. The Variant CRC (VCRC) covers all of the fields of the packet. The combination of the two CRCs allow switches and routers to modify appropriate fields and still maintain an end to end data integrity for the transport control and data portion of the packet. The coverage of the ICRC is different depending on whether the packet is routed to another subnet (i.e. contains a global route header).

The network layer 106 describes the protocol for routing a packet between subnets. Each subnet has a unique subnet ID, the Subnet Prefix. When combined with a Port GUID, this combination becomes a port's Global ID (GID). The source places the GID of the destination in the GRH and the LID of the router in the LRH. Each router forwards the packet through the next subnet to another router until the packet reaches the target subnet. Routers forward the packet based on the content of the GRH. As the packet traverses different subnets, the routers modify the content of the GRH and replace the LRH. The last router replaces the LRH using the LID of the destination. The source and destination GIDs do not change and are protected by the ICRC field. Routers recalculate the VCRC but not the ICRC. This preserves end to end transport integrity.

While, the network layer 106 and the link layer 104 deliver a packet to the desired destination, the transport layer 108 is responsible for delivering the packet to the proper queue pair and instructing the queue pair how to process the packet's data. The transport layer 108 is responsible for segmenting an operation into multiple packets when the message's data payload is greater than the maximum transfer unit (MTU) of the path. The queue pair on the receiving end reassembles the data into the specified data buffer in its memory.

IBA supports any number of upper layers 110 that provide protocols to be used by various user consumers. IBA also defines messages and protocols for certain management functions. These management protocols are separated into Subnet Management and General Services Management.

FIG. 2 is a block diagram of an InfiniBand subnet 200. An IBA subnet 200 is composed of endnodes 202, switches 204, a subnet manager 206 and, possibly one or more router(s) 208. Endnodes 202 may be any one of a processor node, an I/O node, and/or a router (such as the router 208). Switches 204 are the fundamental routing component for intra-subnet communication. The switches 204 interconnect endnodes 202 by relaying packets between the endnodes 202. Routers 208 are the fundamental component for inter-subnet communication. Router 208 interconnects subnets by relaying packets between the subnets.

Switches 204 are transparent to the endnodes 202, meaning they are not directly addressed (except for management operations). Instead, packets transverse the switches 204 virtually unchanged. To this end, every destination within the subnet 200 is configured with one or more unique local identifiers (LID). From the point of view of a switch 204, a LID represents a path through the switch. Packets contain a destination address that specifies the LID of the destination. Each switch 204 is configured with forwarding tables (not shown) that dictate the path a packet will take through the switch 204 based on a LID of the packet. Individual packets are forwarded within a switch 204 to an out-bound port or ports based on the packet's Destination LID and the Switch's 204 forwarding table. IBA switches support unicast forwarding (delivery of a single packet to a single location) and may support multicast forwarding (delivery of a single packet to multiple destinations).

The subnet manager 206 configures the switches 204 by loading the forwarding tables into each switch 204. To maximize availability, multiple paths between endnodes may be deployed within the switch fabric. If multiple paths are available between switches 204, the subnet manager 206 can use these paths for redundancy or for destination LID based load sharing. Where multiple paths exists, the subnet manager 206 can re-route packets around failed links by re-loading the forwarding tables of switches in the affected area of the fabric.

FIG. 3 is a block diagram of an InfiniBand Switch 300. IBA switches, such as the switch 300, simply pass packets along based on the destination address in the packet's LRH. IBA switches do not generate or consume packets (except for management packets). Referring to FIG. 1, IBA switches interconnect the link layers 104 by relaying packets between the link layers 104.

In operation the switch 300 exposes two or more ports 302a, 302b . . . 302n, between which packets are relayed. Each port 302n communicates with a packet relay 304 via a set of virtual lanes 306a though 306n. The packet relay 304 (sometimes referred to as a "hub" or "crossbar") redirects the packet to another port 302, via that port's associated virtual lanes 306, for transmission based on the forwarding table associated with the packet relay 304.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1:
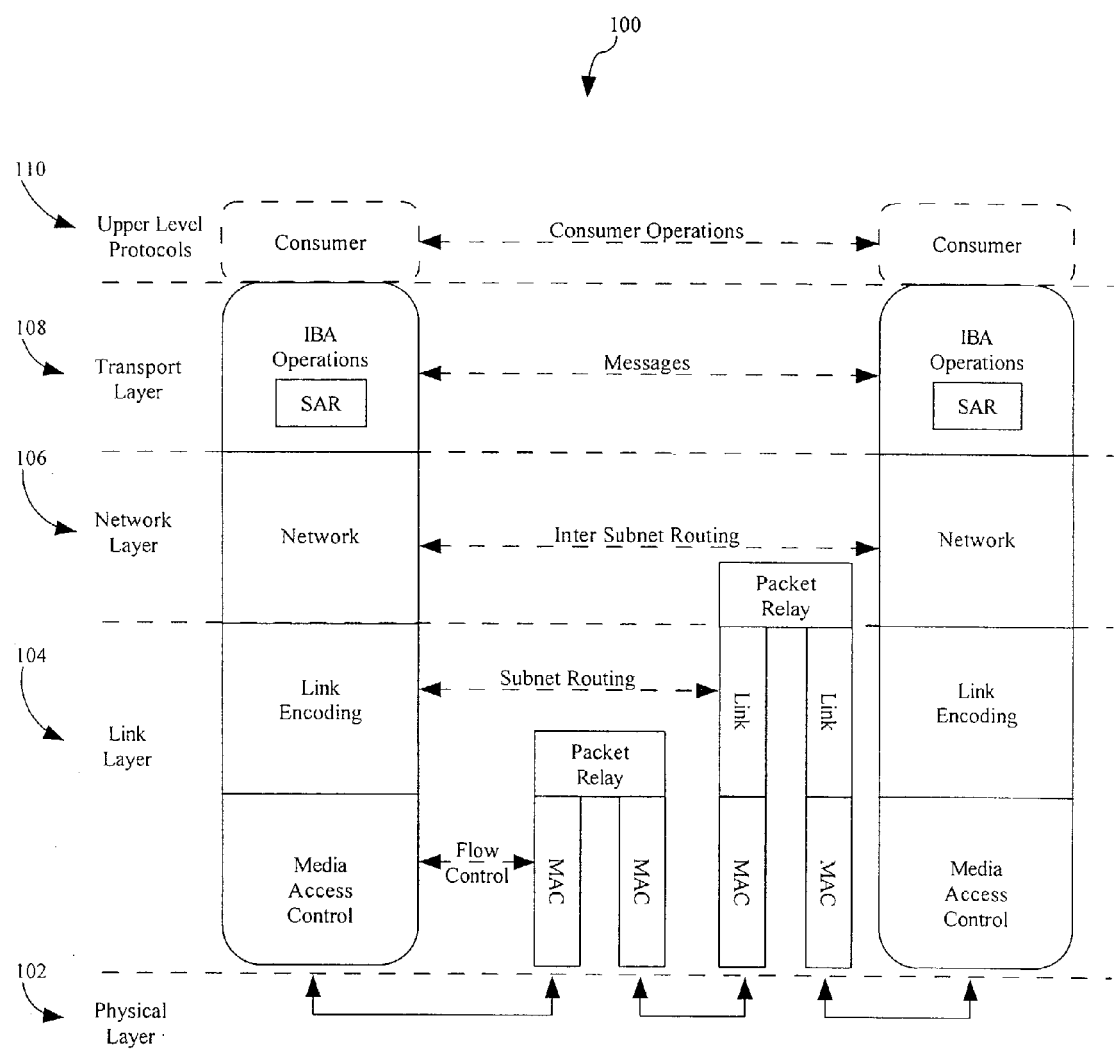
FIG. 1 is a block diagram of the InfiniBand architecture layers.
Figure 2:
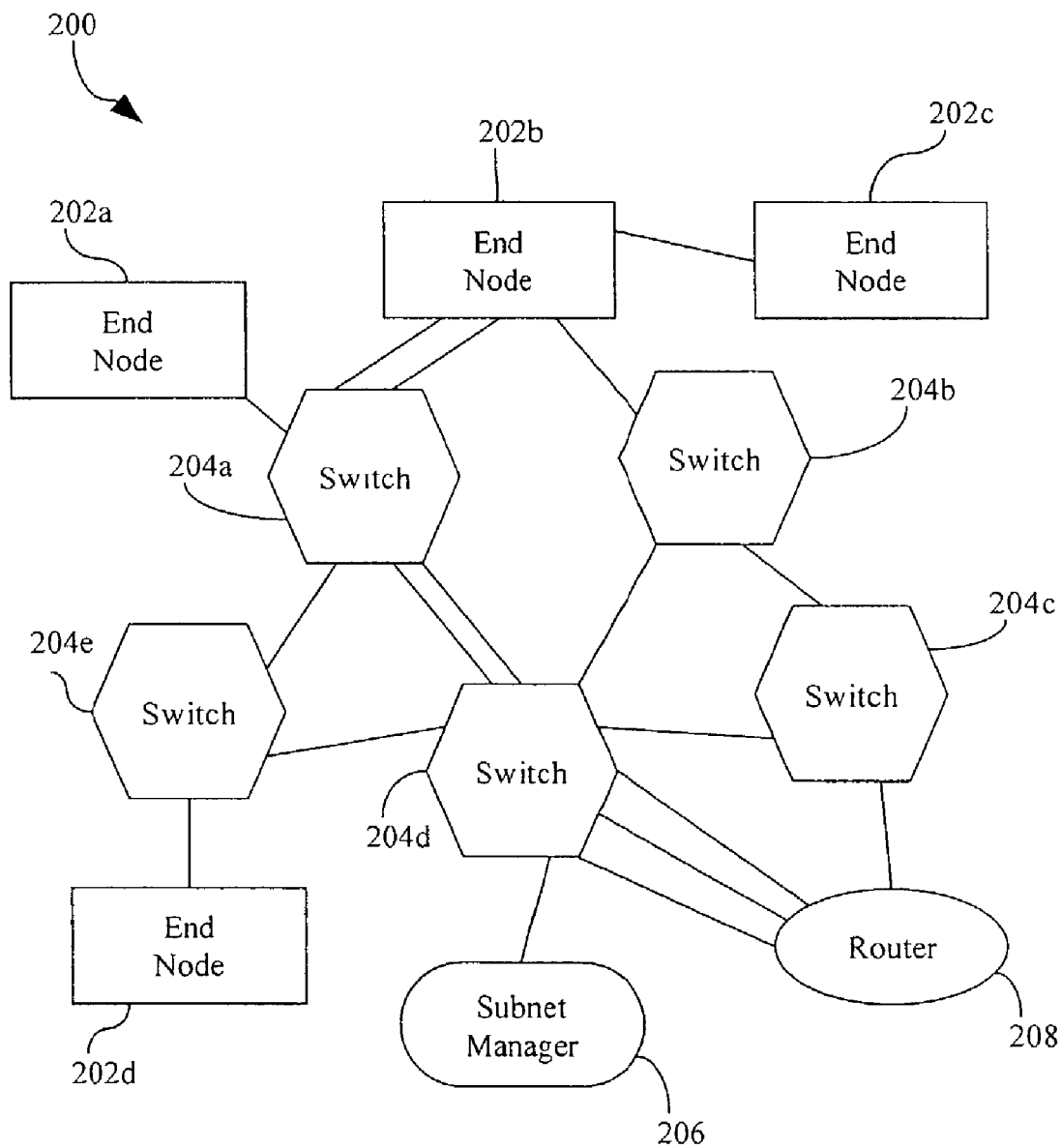
FIG. 2 is a block diagram of an InfiniBand subnet.
Figure 3:
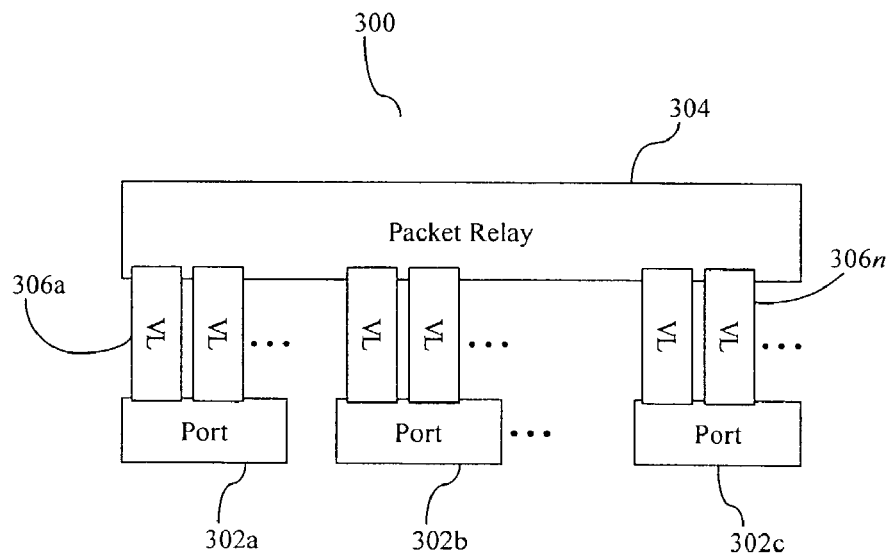
FIG. 3 is a block diagram of an InfiniBand switch.

Reference will now be made in detail to the present invention, examples of which are illustrated in the accompanying drawings, wherein like reference numerals refer to like elements throughout.

In general, the present invention relates to apparatus and method steps embodied in software and associated hardware including computer readable medium, configured to store and/or process electrical or other physical signals to generate other desired signals. In general, the method steps require physical manipulation of data representing physical quantities. Usually, though not necessarily, such data takes the form of electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities they represent and are merely convenient labels applied to such quantities.

Accordingly, the detailed description which follows contains descriptions of methods presented in terms of methods that are described using symbolic representations of data transfixed in a computer readable medium such as RAM, ROM, CR-ROM, DVD, hard disk, floppy disk, data communication channels such as USB, SCSI, or FIREWIRE and/or a network such as IBA, the Internet, or a LAN. These descriptions and representations are the means used by those skilled in the art to effectively convey the substance of their work to others skilled in the art.

The term data processing device encompasses any of a variety of devices that are responsive to data and either perform some operation in response to the receipt thereof or modify the data in accordance with internal or external instructions that may be stored separately from the data processing devices or encoded into the structure of the data processing device. The term "method" is generally used to refer to a series of operations performed by a data processing device and, as such, encompasses such terms of art as "routine," "software," "program," "objects," "functions," "subroutines," and "procedures."

Unless otherwise noted, the methods recited herein may be enabled in one or more integrated circuits configured to perform the method steps taught herein. The required functional structures for such circuits appear in the description given below. Data processing devices that may be configured to perform the functions of the present invention include those manufactured by such companies as AGILENT and CISCO as well as other manufacturers of networking devices.

Figure 4:
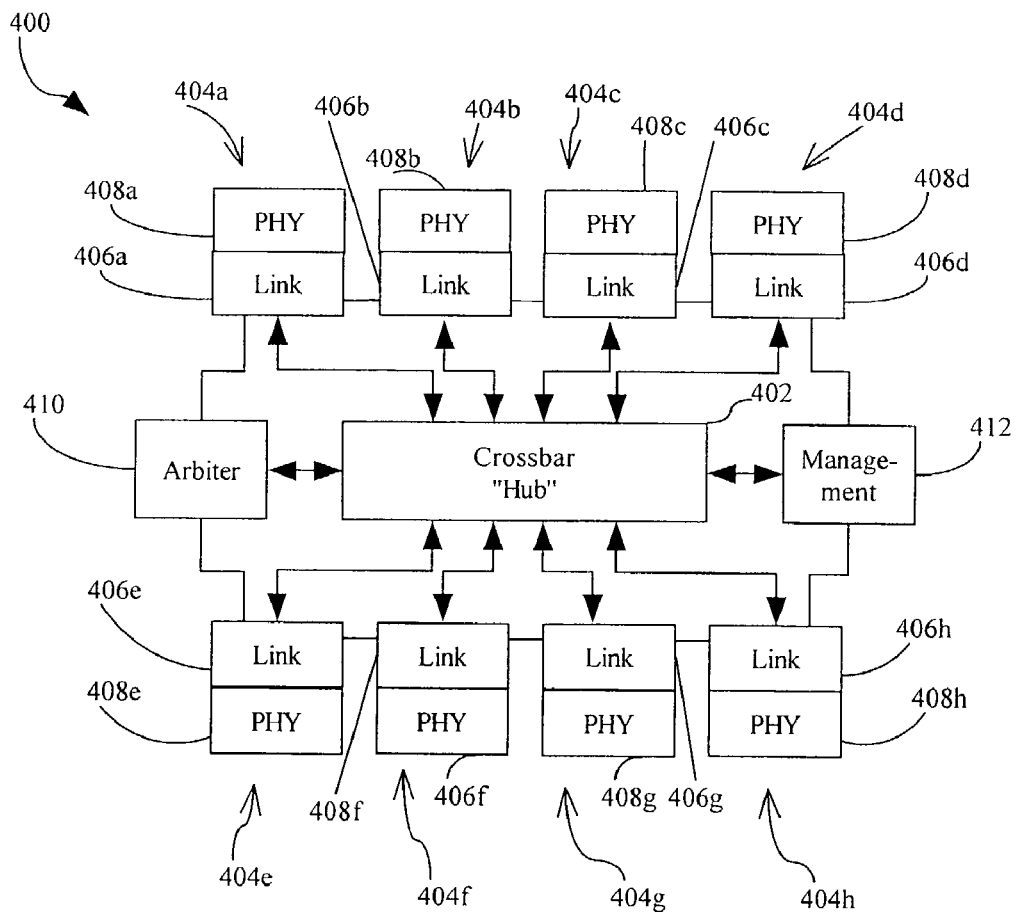
FIG. 4 is a block diagram of an InfiniBand switch in accordance with a preferred embodiment of the present invention.

FIG. 4 is a conceptual block diagram of a switch 400 in accordance with the preferred embodiment of the present invention. It will be appreciated by those of ordinary skill in the relevant arts that the switch 400, as illustrated in FIG. 4, and the operation thereof as described hereinafter is intended to be generally representative of such systems and that any particular switch may differ significantly from that shown in FIG. 4, particularly in the details of construction and operation. As such, the switch 400 is to be regarded as illustrative and exemplary and not limiting as regards the invention described herein or the claims attached hereto.

The switch 400 generally comprises a crossbar 402 (also referred to as a "hub") to which a plurality of ports 402a through 402h are connected. Each port 402 of the switch 400 generally comprises a link block 406 and a physical block 408 ("PHY"). In perhaps the preferred embodiment the crossbar 402 is a nine-port device with one port being reserved for management functions. Port 410 serves as an arbiter while port 412 serves as a management port. The arbiter 410, while technically a port does not function as one in the management scheme discussed herein.

The PHY block 408 primarily serves as a serialize/deserialize ("SerDes") device. The link block 406 performs several functions, including the input buffer, receive ("RX"), transmit ("TX"), and flow control. The input virtual lanes (VLs) are physically contained in input buffers (not shown) of the link block 406. Other functions that may be performed by the link block 406 include: integrity checking, link state and status, error detecting and recording, flow control generation, and output buffering.

The crossbar 402 is preferably implemented as a sparsely populated data path structure. In essence, the crossbar 402 acts as a distributed MUX for every possible input to each output port. The crossbar 402 is preferably combinatorial, and capable of completing the switching process for one 32-bit word within one 250 MHz system clock period (4.0 ns).

Figure 5:
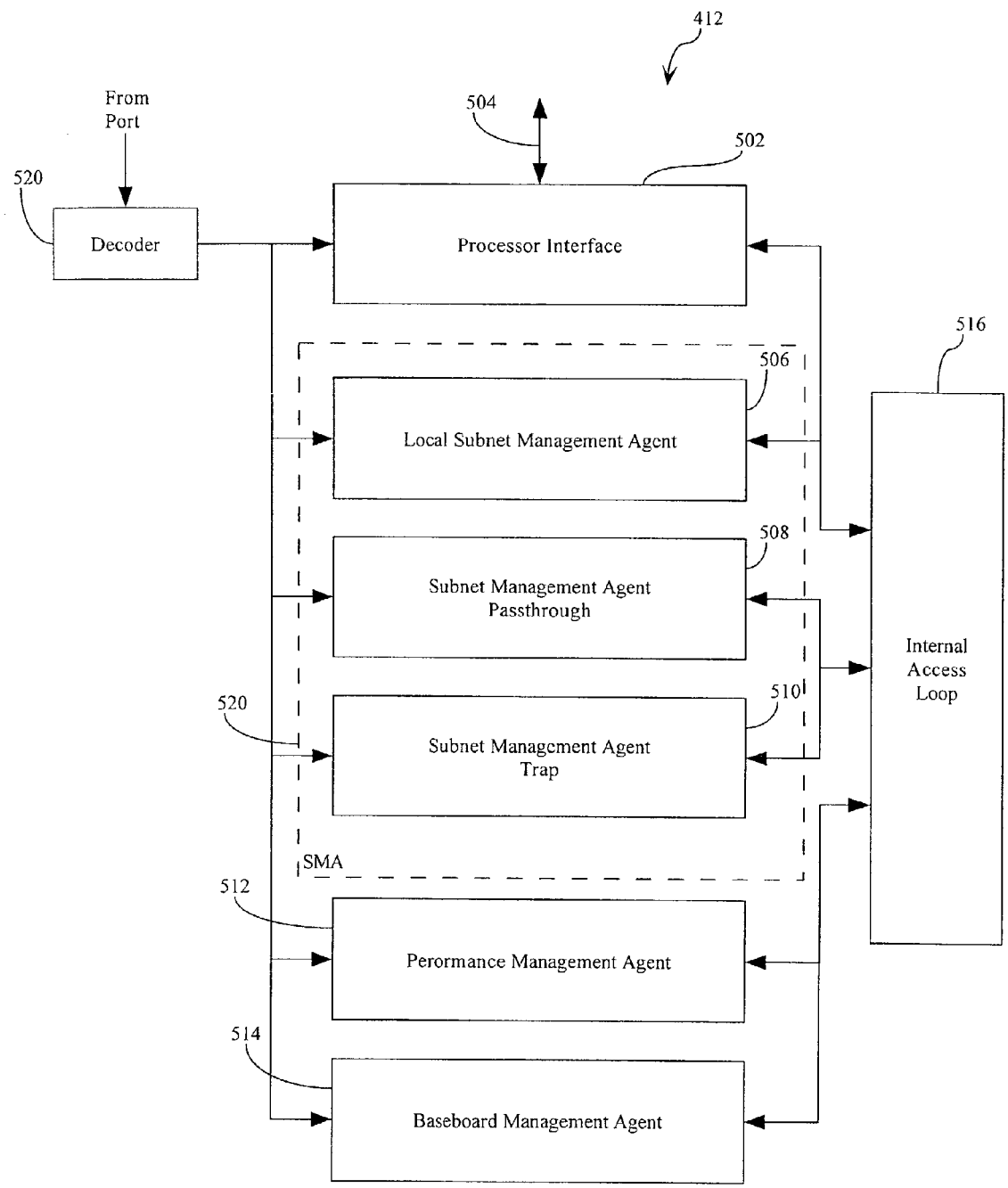
FIG. 5 is a block diagram of a management port on an InfiniBand switch in accordance with a preferred embodiment of the present invention.

FIG. 5 is a block diagram of a management port 412 on an InfiniBand switch in accordance with a preferred embodiment of the present invention. The management port (MP) 412 is preferably attached as internal port number 0. The MP 412 handles InfiniBand management packets including Subnet Management Packets (SMPs), Performance Management Packets (PMPs), and Baseboard Management Packets (BMPs).

In general the MP 412 comprises a plurality of management agents, each agent adapted for handling various types of the management packets. The Local Subnet Management Agent (LSMA) 506 handles a variety of packets for which the MP 412 is the destination. In particular the LSMA 506 handles Virtual Lane 15 (VL 15) Subnet Management Packets, including LID (Local Identifier) Routed Subnet Management Packets and Directed Route Subnet Management Packets for which this switch is the end-node. The Subnet Management Agent Passthru (passthru) 508 handles VL 15 Directed Route Subnet Management Packets for which the MP 412 is not the targeted destination node. The Subnet Management Agent Trap (trap) 510 converts Subnet Management traps detected in this switch chip into VL 15 TRAP SMP. The Performance Management Agent (PMA) 512 handles performance management packets. The Baseboard Management Agent (BMA) 514 handles baseboard management packets.

Optionally, the MP 412 has an outband processor bus interface 504. In this case the MP 412 can be configured to forwards all packets that it does not support to the off-chip processor bus interface 504. If necessary, it is possible to configure the MP 412 to forward all packets to the outband processor bus interface 504.

The MP 412 uses a bus, the internal access loop (IAL) 516, to access registers located in other ports 404 of the switch 400. The MP 412 is the logical start and end of the IAL 516.

The LSMA 506, passthru 508, and trap 510 form a subnet management agent (SMA) 518 that process SMPs received by the switch 400, and generates appropriate responses and traps to be returned to the Subnet Manager (SM) (not shown). The LSMA 506 and passthru 508 each contain one 71×32 buffer for holding one SMP at a time. The trap 518 contains one 64×32 buffer for holding up to four 16×32 notices at a time. Each notice is converted into a Trap( ) SMP as it is transmitted from the SMA 518.

The LSMA 506 and passthru 508 receive SMPs from a management port input interface and store them in their respective buffers while they process them. The LSMA 506 processes SMPs for which this switch is the end-node, either as a LID-routed SMP or as the final destination of a directed-route SMP. The passthru 508 processes SMPs that are passing through this switch as a waypoint along a directed route.

More specifically, upon receipt of SMPs, the LSMA 506 or passthru 508 process the SMP and build up a response SMP in their buffers. When a response SMP is available for transmission, the LSMA 506 or passthru 508 sends a request to a management port request control block (not shown), and once access is granted, transmits the SMP through the management port grant control block (not shown).

A decoder 520 monitors packets as they arrive from the hub into the MP 412. The decoder 520 checks the packets for errors and determines which agent is the intended target (LSMA 506, passthru 508, processor interface 504, PMA 512, or BMA 514). If there is no error, the decoder 520 notifies the appropriate agent when the packet has been fully received. If there is an error, the decoder 520 either forwards the packet to the appropriate agent and notifies the trap 510

(if a trap generation is needed) or simply discards the packet. Preferably, the decoder 520 does not buffer the packets, but rather packets flow through the decoder directly into the buffers located in the individual agents.

Figure 6:
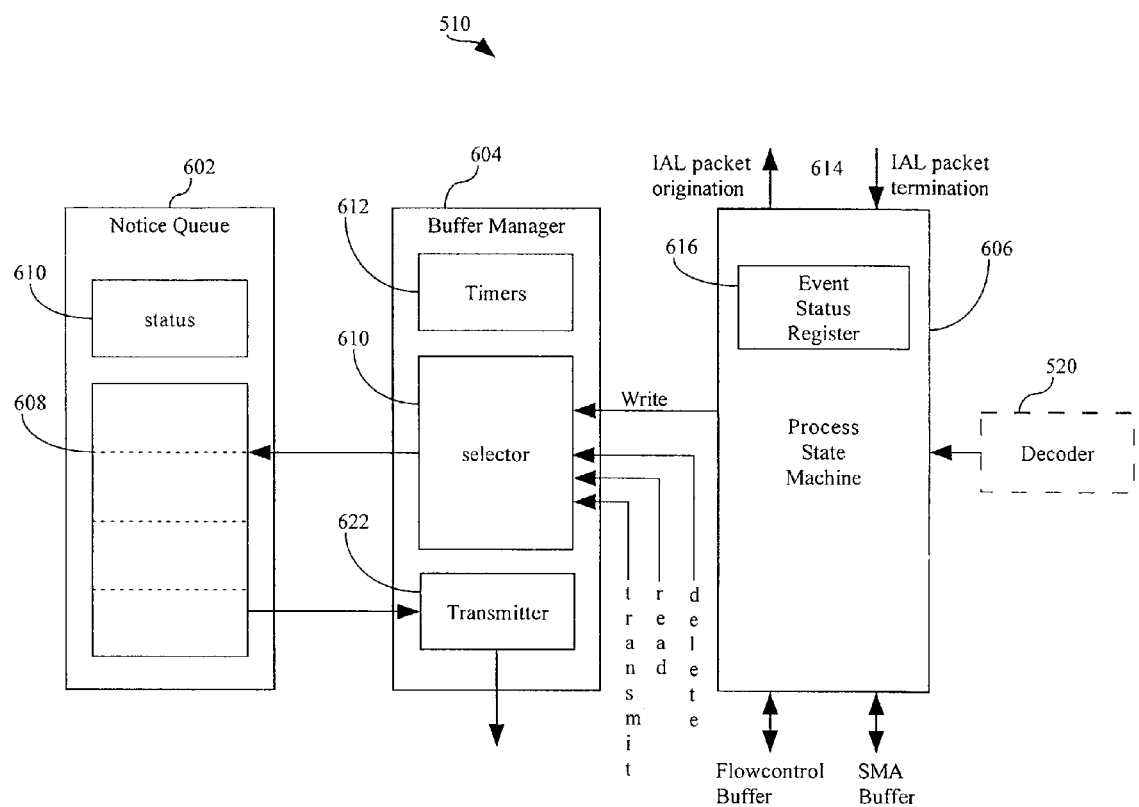
FIG. 6 is a block diagram of a trap shown in FIG. 5 in accordance with a preferred embodiment of the present invention.

FIG. 6 is a block diagram of a trap 510 shown in FIG. 5 in accordance with a preferred embodiment of the present invention. The trap 510 general comprises a notice queue 602, a buffer manager 604 and a process state machine 606. The trap 510 does not receive SMPs but instead monitors conditions in the switch 400, converts detected error conditions into notices queued in the notice queue 602, and generates Trap ( ) SMPs containing information about the events.

In operation, the trap 510 receives a signal (termed a "request"), via an interrupt bus, from a port indicating that an error condition has occurred. In response, the trap 510 transmits an IAL message to the port asking for information about the error condition. Upon receipt of the information, the trap 510 uses the information to create a message in the notice queue 602. Once the message has been formatted, the trap 510 sends the message in a packet describing the error (termed a "trap packet") to the subnet manager (not shown). To transmit a trap packet, the trap 510 sends a request to a management port request control block (not shown), and once granted access, sends the trap packet through the management port's grant control block (not shown). The trap 510 may also receive requests from the decoder 520 with respect to error conditions related to packets received by the MP 412.

The notice queue 602 generally comprises a 4×16×32 buffer 608 holding the notice queue. Each of the four entries is 16×32. The notice queue 602 also contains status logic 610 that keeps track of the start of the queue, the next empty location, and whether or not each location is full and/or transmitted.

The buffer manager 604 controls access to the notice queue 602. For simplicity in managing the queue, only one source at a time is allowed access to the buffer 608. A selector 610 determines which source has access rights to the notice queue 602. Requests from valid sources are passed on to the notice queue 602. Potential sources include: write requests from the process state machine 606; read requests from the LSMA 506; delete requests from the LSMA 506; and read requests during packet transmission. Notice queue delete requests from the LSMA 506 are only accepted when nothing else is accessing the buffer, and nothing else is allowed to access the buffer when a delete request is active. A transmitter 622 provides the interface for transmitting trap packets by building the trap packet from the information available in the notice queue 602. A timer 612 determines when traps may be sent.

The process state machine 606 controls the overall process and is responsible for generating information to be entered into the notice queue 602 and sent out as a trap packet. Specifically, the process state machine 606 generates write requests as required to build the indicated notice, and generates read requests to a flwctl buffer (not shown) along with read requests to a buffer in the LSMA 506 as necessary to obtain details about SMP related error conditions. The process state machine 606 includes an event status register 616, which, in accordance with the preferred embodiment of the present invention, manages which events are to be stored in the notice queue 602. The process state machine 606 may also include an IAL terminal node interface 614 to get event information from link ports.

In more detail, a port 404 that detects an error condition sets an interrupt signal, corresponding to the port, that is received by the trap 510. When an interrupt, e.g. the signal, is received the process state machine creates an IAL packet for the port that transmitted the interrupt requesting an indication of the error condition that caused the interrupt to be issued. Preferably, the indication is provided by setting a bit in a resister corresponding to the port and type of error condition. Once the indication is received, the process state machine 606 generates a trap package in the buffer 608 of the notice queue 602.

In the case of internal SMP events, no initial interrupt is required. Rather, an SMP event is treated similar to the receipt of an indication from a port 404, e.g. a bit is set in the register corresponding to the error condition. However, unlike an indication from a port 404, SMP events trigger information requests internal to the trap 412 as described hereinbelow.

As set forth above, error conditions originate from one of two sources: the decoder 520 or the ports 404 (via the IAL interface 614). The decoder 520 detects bad M Key, bad P Key, and bad Q Key events related to SMPs. Once one of these event is received, the process state machine 606 causes details about the error underlying the events to be collected into the notice queue 602. Details about bad M Key events are obtained from the LSMA 506. The process state machine 606 translates the data read from the LSMA 506 into the notice queue format and writes to the notice queue 602. Details about bad P Key and bad Q Key events are obtained from a flow control buffer (not shown). The LSMA 506 translates the data read from the flow control buffer into the notice queue format and writes to the notice queue 602.

The ports 404 (and in particular the links 406) can request the formation of trap packets based on following conditions: link port state change; link port packet drop rate exceeded; link port P key error rate exceeded; link integrity threshold met; buffer overrun threshold met; and flow control timer expired. Trap packets are generated for each condition by the process state machine 606 without further information required from the ports 404.

The problem arises in arbitrating between the randomly occurring requests from the ports 404 for service by the management port 510. A similar problem arises in arbitrating between randomly occurring trap conditions from the ports 404 and decoder 520 causing the building of the trap packets. There are no defined rules regarding either the order in which requests must be handled or the ability of one request to interrupt the processing of another request. A similar situation exists with respect to the responses to port interrupts. The present invention solves this problem by using three registers, collectively (as they may be implemented physically) shown in FIG. 6 as the event status register 616, to establish priority. The three registers are a status register, a pointer register, and a priority register. All three registers contain one memory element (e.g. a flip-flop) for each request or information response type.

The status register saves the status of each incoming event. Thus, for each event type, a corresponding status register is set when such an event is received. The status register is cleared when the event has been handled.

The pointer register indicates which event type is to be handled next, e.g. has priority. The pointer register may be implemented as a one-hot shift register that always has one, and only one, bit set. The pointer register value is updated each period (or cycle) with its new value dependant upon whether the request corresponding to the currently set bit is active (as indicated by the status register corresponding to the event). If the request is inactive, the pointer register is shifted, e.g. each register is updated to contain the value of the prior register. For example, a 3-bit pointer register containing: 001 is updated to 010; 010 is updated to 100; and 100 would be updated to 001.

The priority register indicated which event is to be handled next and holds its value (indicating which event is currently being handled) until the event handling is complete. The priority register value is the logical AND of the status register and the pointer register. While the priority register is all zeros, no events are handled. When the priority register is non-zero, the request corresponding to the single set value indicated the request to be handled.

With respect to arbitrating among requests from the ports 404 each of the three registers need only be eight bits wide, one bit for each port. An example of the three registers is shown in Table 1.

TABLE 1

| Register | Port 1 | Port 2 | Port 3 | Port 4 | Port 5 | Port 6 | Port 7 | Port 8 |
|---|---|---|---|---|---|---|---|---|
| Status | 1 | 0 | 0 | 1 | 0 | 1 | 0 | 0 |
| Pointer | 0 | 0 | 0 | 1 | 0 | 0 | 0 | 0 |
| priority | 0 | 0 | 0 | 1 | 0 | 0 | 0 | 0 |

In the example shown in Table 1, ports 1, 4 and 6 have issued requests, e.g. set bits in the status register indicating that an error condition has occurred and a trap packet is requested to be constructed. The pointer register is currently pointing to port 4, which, coincidentally, has requested construction of a trap packet. Accordingly, the process state machine 606 will create a IAL packet requesting that port 4 provide an indication of the type of error that precipitated the request. When an IAL packet comes back from port 4, the process state machine 606 will clear the status register for port 4 and the pointer will advance. In the next cycle, assuming no new error conditions in any of the ports, the registers will look as in Table 2.

TABLE 2

| Register | Port 1 | Port 2 | Port 3 | Port 4 | Port 5 | Port 6 | Port 7 | Port 8 |
|---|---|---|---|---|---|---|---|---|
| Status | 1 | 0 | 0 | 0 | 0 | 1 | 0 | 0 |
| Pointer | 0 | 0 | 0 | 0 | 1 | 0 | 0 | 0 |
| priority | 0 | 0 | 0 | 0 | 0 | 0 | 0 | 0 |

As port 5 has not issued a request, nothing further happens. In the next cycle, assuming no new error conditions in any of the ports, the registers will look as in Table 3.

TABLE 3

| Register | Port 1 | Port 2 | Port 3 | Port 4 | Port 5 | Port 6 | Port 7 | Port 8 |
|---|---|---|---|---|---|---|---|---|
| Status | 1 | 0 | 0 | 0 | 0 | 1 | 0 | 0 |
| Pointer | 0 | 0 | 0 | 0 | 0 | 1 | 0 | 0 |
| priority | 0 | 0 | 0 | 0 | 0 | 1 | 0 | 0 |

The pointer register points to port 5, which has requested construction of a trap packet. Accordingly, the process state machine 606 will create a IAL packet requesting that port 5 provide an indication of the type of error that precipitated the request. When an IAL packet comes back from port 5, the process state machine 606 will clear the status register for port 4 and the pointer will advance to port 6. This method continually repeats.

With respect to building the trap packets and arbitrating among information from the decoder 520 and the ports 404 each of the three registers should be at least 51 bits wide. This allows each of the eight ports 404 to indicate up to six error conditions (8×6=48) and the decoder 520 to indicate up to 3 error condition (48+3=51). An example of the three registers is shown in Table 4

TABLE 4

| Register | Port 1 | | | | | | ... | Decoder | | |
|---|---|---|---|---|---|---|---|---|---|---|
| | Error 1 | Error 2 | Error 3 | Error 4 | Error 5 | Error 6 | ... | M Key | P Key | Q Key |
| Status | 1 | 0 | 0 | 1 | 1 | 0 | | 0 | 0 | 1 |
| Pointer | 0 | 0 | 0 | 1 | 0 | 0 | | 0 | 0 | 0 |
| Priority | 0 | 0 | 0 | 1 | 0 | 0 | | 0 | 0 | 0 |

In the example shown in Table 4, port 1 is indicating error conditions 1, 4, and 5 while the decoder 520 is indicating a problem with the Q key. The pointer register is currently pointing to error 4 in port 1, which has been set. Accordingly, the process state machine 606 will create a trap packet in the buffer 608 of the notice queue 602. When the notice queue entry corresponding to the trap packet has been created, the process state machine 606 will clear the status register for error condition 4 in port 1 and the pointer will advance. In the next cycle, assuming no new information from any of the ports, the registers will look as in Table 5.

TABLE 5

| Register | Port 1 | | | | | | ... | Decoder | | |
| | Error 1 | Error 2 | Error 3 | Error 4 | Error 5 | Error 6 | ... | M Key | P Key | Q Key |
|---|---|---|---|---|---|---|---|---|---|---|
| Status | 1 | 0 | 0 | 0 | 1 | 0 | ... | 0 | 0 | 1 |
| Pointer | 0 | 0 | 0 | 0 | 1 | 0 | ... | 0 | 0 | 0 |
| Priority | 0 | 0 | 0 | 0 | 1 | 0 | ... | 0 | 0 | 0 |

In the example shown in Table 5, the pointer register is pointing to error 5 in port 1, which has been set. Accordingly, the process state machine 606 will create a trap packet in the buffer 608 of the notice queue 602. When the notice queue entry corresponding to the trap packet has been created, the process state machine 606 will clear the status register for error condition 5 in port 1 and the pointer will advance. In the next cycle, assuming no new information from any of the ports, the registers will look as in Table 6.

TABLE 6

| Register | Port 1 | | | | | | ... | Decoder | | |
| | Error 1 | Error 2 | Error 3 | Error 4 | Error 5 | Error 6 | ... | M Key | P Key | Q Key |
|---|---|---|---|---|---|---|---|---|---|---|
| Status | 1 | 0 | 0 | 0 | 0 | 0 | ... | 0 | 0 | 1 |
| Pointer | 0 | 0 | 0 | 0 | 0 | 1 | ... | 0 | 0 | 0 |
| Priority | 0 | 0 | 0 | 0 | 0 | 0 | ... | 0 | 0 | 0 |

In the example shown in Table 6, the pointer register is currently pointing to error 6 in port 1, which has not been set. Accordingly, no action will be taken and the pointer will advance to error condition 1 of port 2.

In accordance with the preferred embodiment of the present invention, the above described arbitration scheme has no default priority and therefore no event type will be favorably handled over ant other request type. Further, the above described arbitration scheme is simple to implement and can be easily expanded to handle additional event types.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A switch for use with an InfiniBand network, the switch comprising:
   a crossbar that redirects packet based data based on a forwarding table;
   at least one port that receives data from a network and selectively transfers that data to the crossbar; and
   a management port that receives requests to generate trap packets, the management port comprising:
      a first resister configured to store an indication of the type of request and the port issuing the request;
      a second register configured to indicate which request has the priority to be handled next; and
      a third register that indicates which request is to be handled next.

2. A switch, as set forth in claim 1, wherein the third register contains the logical AND of the first register and the second register.

3. A switch, as set forth in claim 1, wherein the second register is a one-hot shift register.

4. A switch, as set forth in claim 1, wherein the at least one port comprises a plurality of ports.

5. A switch, as set forth in claim 4, wherein each port can issue requests for attention and wherein the first register has at least as many bits as there are ports, each bit being associated with a port;
   the second register has at least as many bits as there are ports and is configured as a one-hot shift register in which the hot bit indicates the port that currently has priority; and
   the third register contains the logical AND of the contents of first and second registers.

6. A switch, as set forth in claim 5, wherein the management port handles a request by transmitting a request to the port for information on the circumstances leading to the request.

7. A switch, as set forth in claim 6, wherein each port can respond with a plurality of indications regarding the circumstances leading to the request, and wherein
   the first register has at least n bits where n is the number of ports times the number of indications.

8. A switch, as set forth in claim 7, wherein the management port creates a trap packet.

9. A switch, as set forth in claim 6, wherein each port can respond with a plurality of indications regarding the circumstances leading to the request, wherein the management port can issue a plurality of indications, and wherein the first register has at least n bits where n is the number of ports times the number of indications that can be issued by each port plus the number of indications that can be issued by the management port.

10. A switch, as set forth in claim 9, wherein the management port handles the indications from the ports by creating a trap packet and handles the indications from the management port by requesting further information from the management port.

11. A method of arbitrating among equal priority requests from a plurality of ports in an InfiniBand switch, the method comprising:

storing an indication of a port issuing the request by setting a bit corresponding to the port that issued the request in a first register that has at least one bit per port;

cycling a pointer through each port;

when the pointer points to a port for which an indication has been stored, handling the request from that port; and clearing the indication associated with the port once the request has been handled.

12. A method, as set forth in claim 11, wherein the step of cycling comprises shifting a bit through a second register having at least one bit per port.

13. A method, as set forth in claim 12, further comprising:

ANDing the first and second registers to determine when the pointer points to a port for which an indication has been stored.

* * * * *

UNITED STATES PATENT AND TRADEMARK OFFICE
CERTIFICATE OF CORRECTION

PATENT NO. : 7,200,151 B2  Page 1 of 1
APPLICATION NO. : 10/184168
DATED : April 3, 2007
INVENTOR(S) : Venitha Manter It is certified that error appears in the above-identified patent and that said Letters Patent is hereby corrected as shown below:

Col. 11 Line 59 In Claim 1, delete "resister" and insert -- register --, therefor.

Signed and Sealed this

Twenty-third Day of December, 2008

JON W. DUDAS
*Director of the United States Patent and Trademark Office*